No. 653,416. Patented July 10, 1900.
H. L. IDE.
GOVERNOR.
(Application filed Mar. 31, 1900.)
(No Model.) 2 Sheets—Sheet 1.
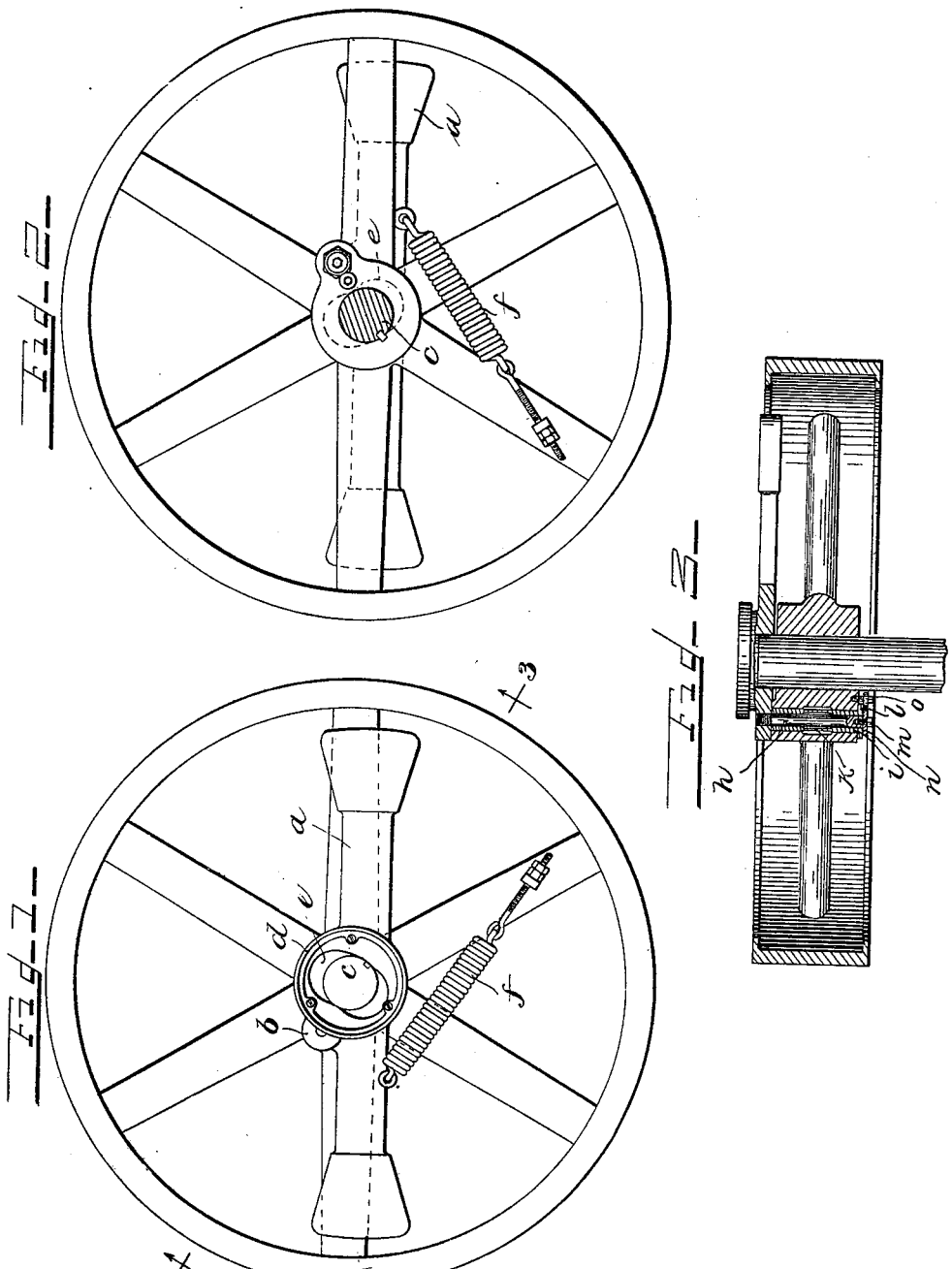
Witnesses
Chas. J. Schmidt.
Max W. Zabel.
Inventor
HARRY L. IDE
By Charles A. Brown & Cragg
Attorneys No. 653,416.
H. L. IDE.
GOVERNOR.
(Application filed Mar. 31, 1900.)
(No Model.)
Patented July 10, 1900.
2 Sheets—Sheet 2.
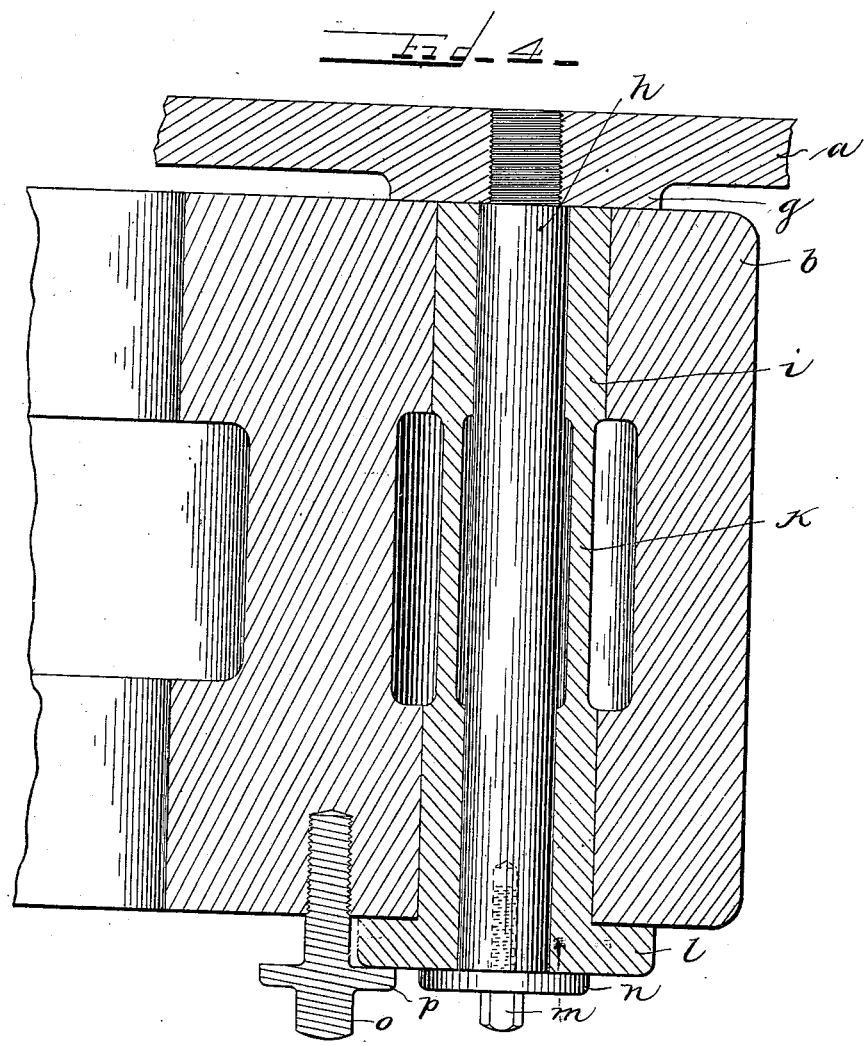

UNITED STATES PATENT OFFICE.

HARRY L. IDE, OF SPRINGFIELD, ILLINOIS, ASSIGNOR TO THE A. L. IDE & SONS, OF SAME PLACE.

GOVERNOR.

SPECIFICATION forming part of Letters Patent No. 653,416, dated July 10, 1900.

Application filed March 31, 1900. Serial No. 10,924. (No model.)

*To all whom it may concern:*

Be it known that I, HARRY L. IDE, a citizen of the United States, residing at Springfield, in the county of Sangamon and State of Illinois, have invented a certain new and useful Improvement in Governors, (Case No. 2,) of which the following is a full, clear, concise, and exact description, reference being had to the accompanying drawings, forming a part of this specification.

My invention relates to governors, and more particularly to fly-wheel or shaft governors employing inertia-bars mounted eccentrically with relation to the shafts. These inertia-bars serve to operate the eccentrics, which are preferably carried by the inertia-bars, the eccentrics being thus swinging eccentrics. Heretofore the inertia-bars, which are heavy and usually weighted at their ends, have been secured to journal-pins passing through spoke or hub portions of the fly-wheels. The journal-pins supporting the inertia-bars are thus not equidistant from the ends of the bars and are usually located at one longitudinal edge of each bar. As a result of this construction it is difficult to maintain a perfectly-smooth bearing for the inertia-bar pin, owing to the action of centrifugal force upon the unbalanced weight in the bar, the pin and its journal being thereby subjected to non-uniformly-distributed pressure, making effective lubrication difficult. The bore receiving the inertia-bar pin is also likely to become unevenly enlarged. It is well known that metal parts of different composition that have oscillating engagement will have ridges formed in the engaging surfaces, owing to the non-uniformity in the density or fiber of the metals, so that after a period of operation the friction between the working parts is gradually increased.

It is the object of my invention to provide the inertia-bar pin with a special journal in the form of a bushing to be received by an aperture in a spoke or hub portion of the wheel. The bushing is adapted for adjustment within its containing-socket in the fly-wheel, means being provided for securing the bushing to the fly-wheel in any position to which it has been adjusted, and by this means the pin is removed from direct contact with the cast metal of the fly-wheel. The journal, which is preferably in the form of an integral cylinder, may be rotated from time to time to distribute the wear and prevent irregularities from forming in the journal and pin, whereby the inertia-bar may oscillate without great friction and whereby the lubrication of the pin may be effectively maintained.

I will explain my invention more fully by reference to the accompanying drawings, illustrating the preferred embodiment thereof, in which—

Figure 1 is a side view of a fly-wheel or shaft governor. Fig. 2 is a reverse side view of the governor, showing the manner of mounting the same according to my invention. Fig. 3 is a sectional view on line 3 3 of Fig. 1. Fig. 4 is a detailed enlarged sectional view, showing particularly the construction of my invention.

Like parts are indicated by similar characters of reference throughout the different figures.
In the drawings a fly-wheel governor having an inertia-bar $a$ is illustrated. This inertia-bar is pivotally mounted at the hub portion $b$ of the fly-wheel, the pivotal mounting of the inertia-bar being sufficiently removed from the axis of the shaft $c$ to permit the eccentric $d$, which is shown as rigidly secured to the inertia-bar, to have the required range of movement. The shaft $c$ projects through a slot $e$, provided in the eccentric, the slot permitting the eccentric to be swung from side to side. A governor-spring $f$ is provided to act in the well-known way, one end of the governor-spring being attached to the fly-wheel and the other end to the inertia-bar at a point distant from its pivotal mounting. The inertia-bar is provided with a circular shoulder or boss $g$ to remove the bar a sufficient distance from the fly-wheel to give it freedom of movement. The inertia-bar has engagement with a reduced threaded extension of the inertia-bar pin $h$, made of steel of suitable grade, this pin being contained in a journal sleeve or bushing $i$, secured in place upon the fly-wheel in any suitable way. The sleeve or bushing $i$ has its outer circumference or periphery concentric with respect to the pin $h$, so that a rotary adjustment of the bushing will not affect the adjustment of the governor. I preferably remove a central portion of the bushing at $k$, both upon the interior and exterior, whereby the exterior portion of the bushing is decreased and the bore of the bushing is enlarged, a corresponding portion of the fly-wheel at this point being also removed so that more perfect alinement and fit may be secured between the inertia-bar pin and the bore receiving the bushing. The bushing is preferably provided with a shoulder $l$ at the opposite end from the inertia-bar, this shoulder being preferably of hexagonal contour, so that it may be engaged by a wrench to effect the rotation of the bushing, although other means may be employed for effecting this rotation. The inertia-bar pin is adapted to receive a bolt $m$ with its stem, which passes through a washer $n$ of larger diameter than the pin, the said washer thus forming a shoulder upon the pin which prevents its withdrawal through the bore in the bushing, the shoulder $l$ in turn preventing the withdrawal of the bushing through the bore in the fly-wheel containing the same. In this manner the inertia-bar is prevented from being removed from the fly-wheel. I provide means whereby the bushing after being rotated to any desired position is secured in its adjusted position. I preferably employ the means illustrated, comprising a clamping-screw $o$, having threaded engagement with the body or hub portion of the fly-wheel, this clamping-screw being provided with a shoulder $p$, that engages the shoulder $l$ upon the bushing. After a period of operation the clamping-screw $p$ is loosened and the bushing $l$ rotated to present a new wearing-surface to the pin, this readjustment of the bushing being secured by the clamping-screw $p$.

While I have herein shown and particularly described the preferred embodiment of my invention, I do not wish to be limited to the precise construction shown; but,

Having thus described my invention, I claim as new and desire to secure by Letters Patent—

1. In a fly-wheel governor, the combination with an inertia-bar, of an eccentric operated thereby, a journal-pin carrying the bar, a rotatably-adjusted journal-bushing receiving the said pin, the outer circumference of the bushing being concentric with the pin, said pin being located eccentrically with relation to the shaft of the fly-wheel, and means for securing the bushing to the fly-wheel in any position of rotary adjustment, the said means permitting readjustment of the bushing, substantially as described.

2. In a fly-wheel governor, the combination with an inertia-bar, of an eccentric operated thereby, a journal-pin carrying the bar, a rotatably-adjusted journal-bushing receiving the said pin, the outer circumference of the bushing being concentric with the pin, said bushing being provided with a shoulder $l$ affording means for effecting the rotary adjustment of the bushing and preventing it from being withdrawn from the fly-wheel, the journal-pin being provided with a shoulder $n$ to prevent it from being withdrawn from the bushing, and means for securing the bushing to the fly-wheel in its position of rotary adjustment, substantially as described.

3. In a fly-wheel governor, the combination with an inertia-bar, of an eccentric operated thereby, a journal-pin carrying the bar, a rotatably-adjusted journal-bushing receiving the said pin, the outer circumference of the bushing being concentric with the pin, said bushing being provided with a shoulder $l$ affording means for effecting the rotary adjustment of the bushing and preventing it from being withdrawn from the fly-wheel, the journal-pin being provided with a shoulder $n$ to prevent it from being withdrawn from the bushing, and a clamping-screw provided with a shoulder $p$ adapted to engage the shoulder $l$ and secure the bushing to the fly-wheel in any position of rotary adjustment, substantially as described.

4. In a fly-wheel governor, the combination with an inertia-bar, of an eccentric operated thereby, a journal-pin carrying the bar, a rotatably-adjusted journal-bushing receiving the said pin, the outer circumference of the bushing being concentric with the pin, said bushing being provided with a shoulder $l$ affording means for effecting the rotary adjustment of the bushing and preventing it from being withdrawn from the fly-wheel, the journal-pin being provided with a shoulder $n$ to prevent it from being withdrawn from the bushing, a bolt $m$ for securing the collar $n$ in place, and means for securing the bushing to the fly-wheel in its position of rotary adjustment, substantially as described.

5. In a fly-wheel governor, the combination with an inertia-bar, of an eccentric operated thereby, a journal-pin carrying the bar, a rotatably-adjusted journal-bushing receiving the said pin, the outer circumference of the bushing being concentric with the pin, said pin being located eccentrically with relation to the shaft of the fly-wheel, the bore of the bushing being enlarged at its central interior portion, and means for securing the bushing to the fly-wheel in any position of rotary adjustment, the said means permitting readjustment of the bushing, substantially as described.

6. In a fly-wheel governor, the combination with an inertia-bar, of an eccentric operated thereby, a journal-pin carrying the bar, a rotatably-adjusted journal-bushing receiving the said pin, the outer circumference of the bushing being concentric with the pin, said pin being located eccentrically with relation to the shaft of the fly-wheel, the bushing being reduced upon its exterior at its central portion, and means for securing the bushing to the fly-wheel in any position of rotary adjustment, the said means permitting readjustment of the bushing, substantially as described.

7. In a fly-wheel governor, the combination with an inertia-bar, of an eccentric operated thereby, a journal-pin carrying the bar, a rotatably-adjusted journal-bushing receiving the said pin, the outer circumference of the bushing being concentric with the pin, said pin being located eccentrically with relation to the shaft of the fly-wheel, the bushing being reduced at its central portion upon its exterior and having its bore at its central portion enlarged, and means for securing the bushing to the fly-wheel in any position of rotary adjustment, the said means permitting readjustment of the bushing, substantially as described.

In witness whereof I hereunto subscribe my name.

HARRY L. IDE.

Witnesses:
T. P. LUBY,
ADA L. AYERS.